(12) United States Patent
Al-Dhahir et al.

(10) Patent No.: US 7,796,718 B2
(45) Date of Patent: *Sep. 14, 2010

(54) FINITE-LENGTH EQUALIZATION OVER MULTI-INPUT MULTI-OUTPUT (MIMO) CHANNELS

(76) Inventors: Naofal Al-Dhahir, 105 Harter Rd., Morristown, NJ (US) 07960; Ali H Sayed, 10811 Ashton Ave, Los Angeles, CA (US) 90024

( * ) Notice: Subject to any disclaimer, the term of this patent is extended or adjusted under 35 U.S.C. 154(b) by 0 days.

This patent is subject to a terminal disclaimer.

(21) Appl. No.: 12/549,952

(22) Filed: Aug. 28, 2009

(65) Prior Publication Data

US 2009/0323797 A1 Dec. 31, 2009

Related U.S. Application Data

(63) Continuation of application No. 12/287,203, filed on Oct. 7, 2008, now Pat. No. 7,586,984, which is a continuation of application No. 10/911,789, filed on Aug. 5, 2004, now Pat. No. 7,433,402, which is a continuation of application No. 09/671,638, filed on Sep. 28, 2000, now Pat. No. 6,870,882.

(60) Provisional application No. 60/158,714, filed on Oct. 8, 1999, provisional application No. 60/158,713, filed on Oct. 8, 1999.

(51) Int. Cl.
*H04B 7/10* (2006.01)
(52) U.S. Cl. ................ 375/347; 375/233; 700/53
(58) Field of Classification Search ............... 375/347, 375/233; 700/53
See application file for complete search history.

(56) References Cited

U.S. PATENT DOCUMENTS

| | | | | | |
|---|---|---|---|---|---|
| 3,879,664 | A | * | 4/1975 | Monsen | 375/232 |
| 4,281,411 | A | * | 7/1981 | Bonn et al. | 375/232 |
| 5,371,762 | A | * | 12/1994 | Amrany et al. | 375/350 |
| 5,398,259 | A | * | 3/1995 | Tsujimoto | 375/233 |
| 5,469,517 | A | * | 11/1995 | Ohta | 382/252 |
| 5,561,687 | A | * | 10/1996 | Turner | 375/233 |
| 5,592,517 | A | * | 1/1997 | Camp et al. | 375/350 |
| 5,712,873 | A | * | 1/1998 | Shiue et al. | 375/233 |
| 6,002,713 | A | * | 12/1999 | Goldstein et al. | 375/222 |
| 6,011,813 | A | * | 1/2000 | Ghosh | 375/233 |
| 6,122,015 | A | * | 9/2000 | Al-Dhahir et al. | 348/614 |
| 6,144,697 | A | * | 11/2000 | Gelfand et al. | 375/233 |
| 6,154,501 | A | * | 11/2000 | Friedman | 375/260 |
| 6,222,592 | B1 | * | 4/2001 | Patel | 348/614 |
| 6,337,878 | B1 | * | 1/2002 | Endres et al. | 375/229 |
| 6,414,990 | B1 | * | 7/2002 | Jonsson et al. | 375/232 |

(Continued)

OTHER PUBLICATIONS

Tidestav, "Realizable MIMO Decision Feedback Equalizers: Structure and Design" Sep. 1998, this reference can be found at http://www.signal.uu.se/Publications/pdf/r982.pdf.*

(Continued)

*Primary Examiner*—Juan A Torres (57) ABSTRACT

A MIMO Decision Feedback Equalizer improves operation of a receiver by canceling the spatio-temporal interference effects caused by the Multiple-Input-Multiple-Output (MIMO) channel memory with a set of Finite Impulse Response (FIR) filters in both the feed-forward and the feedback MIMO filters. The coefficients of these FIR filters can be fashioned to provide a variety of controls by the designer.

3 Claims, 4 Drawing Sheets

U.S. PATENT DOCUMENTS 6,442,198 B1 * 8/2002 Harman ............ 375/233
6,570,919 B1 * 5/2003 Lee ............ 375/233

OTHER PUBLICATIONS

Tidestav,"The multivariable decision feedback equalizer Multiuser Detection and Interference Rejection", Uppsala University 1999, this reference can be found at http://www.signal.uu.se/Publications/pdf/a993.pdf.*

Choi, "A hybrid learning approach to blind deconvolution of MIMO systems", Proceedings of the IEEE Signal Processing Workshop on Higher-Order Statistics, 1999, Jun. 14-16, 1999 pp. 292-295.*

Al-Dhahir, "A computationally-efficient FIR MMSE-DFE for multi-user communications", Conference Record of the Thirty-Third Asilomar Conference on Signals, Systems, and Computers, 1999, vol. 1, Oct. 24-27, 1999 pp. 207-209 vol. 1.*

Yang, "Joint Transmitter-Receiver Optimization for Multi-Input Multi-Output Systems with Decision Feedback," IEEE Transactions on Information Theory, vol. 40, No. 5, Sep. 1994, pp. 1334-1347.*

Duel-Hallen, "A Family of Multiuser Decision-Feedback Detectors for Asynchronous Code- Division Multiple-Access Channels," IEEE Transactions on Communications, col. 43, No. 2/3 14, Feb./Mar. Apr. 1995, pp. 412-434.*

Duel-Hallen,, "Equalizers for Multiple Input/Multiple Output Channels and PAN Systems with Cyclostationary Sequences," IEEE Journal on Selected Areas in Communications, vol. 10, No. 3, Apr. 1992, pp. 630-639.*

Al-Dhahir, "The Finite-Length Multi-Input Multi-Output MMSE-DFE," IEEE Transactions on Signal Processing, vol. 48, No. 10, Oct. 2000, pp. 2921-2936.*

* cited by examiner

FINITE-LENGTH EQUALIZATION OVER MULTI-INPUT MULTI-OUTPUT (MIMO) CHANNELS

RELATED APPLICATION

This is a continuation of U.S. patent application Ser. No. 12/287,203, filed Oct. 7, 2008, now U.S. Pat. No. 7,586,984, issued Sep. 8, 2009, which is a continuation application of U.S. patent application Ser. No. 10/911,789, filed Aug. 5, 2004, now U.S. Pat. No. 7,433,402 issued Oct. 7, 2008, which is a continuation of U.S. patent application Ser. No. 09/671, 638 filed Sep. 28, 2000, now U.S. Pat. No. 6,870,882, issued Mar. 22, 2005. This application claims priority from Provisional application No. 60/158,714, filed on Oct. 8, 1999. This application is also related to a Provisional application No. 60/158,713, also filed on Oct. 8, 1999.

BACKGROUND OF THE INVENTION

In multi-user communication over linear, dispersive, and noisy channels, the received signal is composed of the sum of several transmitted signals corrupted by inter-symbol interference, inter-user interference, and noise. Examples include TDMA (time division multiple access) digital cellular systems with multiple transmit/receive antennas, wide-band asynchronous CDMA (code division multiple access) systems, where inter-user interference is also known as multiple access interference, wide-band transmission over digital subscriber lines (DSL) where inter-user interference takes the form of near-end and far-end crosstalk between adjacent twisted pairs, and in high-density digital magnetic recording where inter-user interference is due to interference from adjacent tracks.

Multi-user detection techniques for multi-input multi-output (MIMO) systems have been shown to offer significant performance advantages over single user detection techniques that treat inter-user interference as additive colored noise and lumps its effects with thermal noise. Recently, it has been shown that the presence of inter-symbol interference in these MIMO systems could enhance overall system capacity, provided that effective multi-user detection techniques are employed.

The optimum maximum likelihood sequence estimation (MLSE) receiver for MIMO channels was developed by S. Verdu, "Minimum Probability of Error for Asynchronous Gaussian Multiple Access Channels," *IEEE Transactions on Information Theory*, January 1986, pp. 85-96. However, its exponential complexity increases with the number of users, and channel memory makes its implementation costly for multi-user detection on severe-inter-symbol interference channels.

Two alternative transceiver structures have been recently proposed for MIMO dispersive channels as well. These structures, which are widely used in practice for single-input single-output dispersive channels, are the Discrete Multitone and minimum-mean-square-error decision feedback equalizer (MMSE-DFE). In the latter category, this includes A. Duel-Hallen "Equalizers for Multiple Input Multiple Output Channels and PAN Systems with Cyclostationary Input Sequences," *IEEE Journal on Selected Areas on Communications*, April 1992, pp. 630-639; A. Duel-Hallen "A Family of Multiuser Decision-Feedback Detectors for Asynchronous Code Division Multiple Access Channels," *IEEE Transactions on Communications*, February/March/April 1995, pp. 421-434; J. Yang et an "Joint Transmitter and Receiver Optimization for Multiple Input Multiple Output Systems with Decision Feedback," *IEEE Transactions on Information Theory*, Sep. 1994, pp. 1334-1347; and J. Yang et al "On Joint Transmitter and Receiver Optimization for Multiple Input Multiple Output (MIMO) Transmission Systems," *IEEE Transactions on Communications*, Dec. 1994, pp. 3221-3231. Alas, the prior art does not offer a practical MIMO MMSE-DFE receiver with feedforward and feedback FIR (finite impulse response) filters whose coefficients can be computed in a single computation (i.e., non-iteratively) in real-time under various MIMO detection scenarios.

SUMMARY

An advance in the art is realized with receiver having a multiple number of receiving antennas that feed a MIMO feedforward filter that is constructed from FIR filters with coefficients that are computed based on environment parameters that are designer-specified. Signals that are derived from a multiple-output feedback filter structure are subtracted from the signals from the multiple outputs of the feedforward filter structure, and the resulting difference signals are applied to a decision circuit. Given a transmission channel that is modeled as a set of FIR filters with memory v, a matrix W is computed for a feedforward filter that results in an effective transmission channel B with memory $N_b$, where $N_b < v$, where B is optimized so that $B_{opt} = \text{argmin}_B \text{trace}(R_{ee})$ subject to selected constraints; $R_{ee}$ being the error autocorrelation function. The feedback filter is modeled by $[I_{n_i} \, 0_{n_i \times n_i N_b}] - B^*$, where $n_i$ is the number of outputs in the feedforward filter, as well as the number of outputs in the feedback filter.

The coefficients of feedforward and the feedback filters, which are sensitive to a variety of constraints that can be specified by the designer, are computed by a processor in a non-iterative manner, only as often as it is expected for the channel characteristics to change.

DETAILED DESCRIPTION

Figure 1:
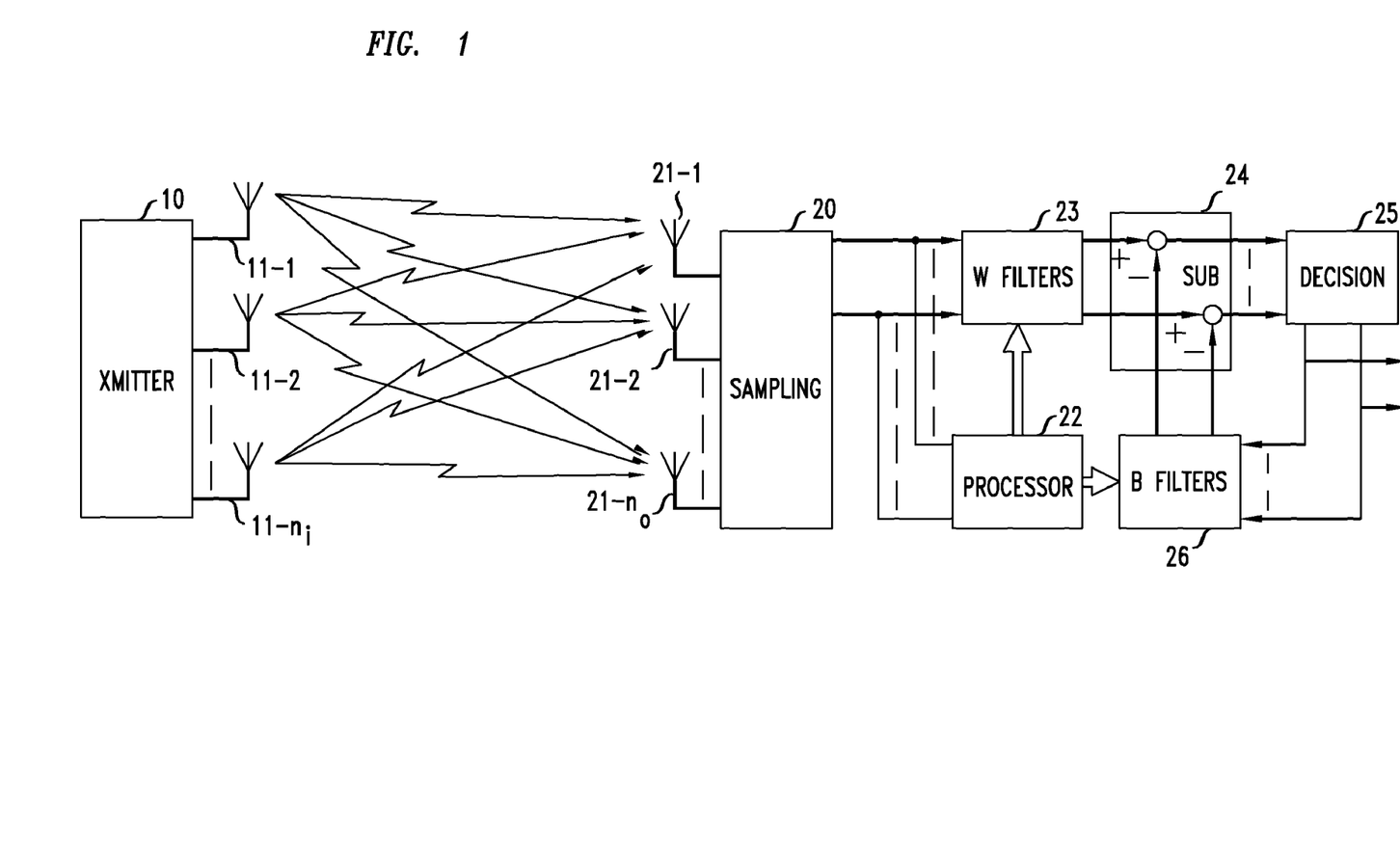
FIG. 1 shows the major elements of a receiver in accord with the principles disclosed herein.

FIG. 1 depicts the general case of an arrangement having a transmitter element 10 with $n_i$ transmitting antennas 11-1, 11-2, ... 11-$n_i$, that output signals (e.g., space-time encoded signals) to a transmission channel, and $n_o$ receiving antennas 21-1, 21-2, ... 21-$n_o$. Each transmitting antenna p outputs a complex-valued signal $x_p$, the signals of the $n_i$ antennas pass through a noisy transmission channel, and the $n_o$ receiving antennas capture the signals that passed through the transmission channel. The received signals are oversampled by a factor of l in element 20 and applied to feedforward W filters 23. Thus, the sampling clock at the output of element 20 is of period $T_s = T/l$, where T is the inter-symbol period at the transmitting antennas. The transmission channel's characterization is also referenced to $T_s$.

Filter bank 23 delivers an $n_i$ plurality of output signals ($n_i$ can equal $n_q$ for example) from which feedback signals are subtracted in circuit 24 and applied to decision circuits 25 (comprising conventional slicers). The outputs of decision circuits 25 are applied to feedback filters 26, which develop the feedback signals. Processor 22 develops the filter coefficients for the filters within elements 23 and 26 and installs the coefficients in the filters within these elements, as disclosed in detail below.

In the illustrative embodiment disclosed herein, the received signal is expressed by $$y_k^{(j)} = \sum_{i=1}^{n_i} \sum_{m=0}^{v^{(i,j)}} h_m^{(i,j)} x_{k-m}^{(i)} + n_k^{(j)}, \quad (1)$$

where $y_k^{(j)}$ is the signal at time k at the $j^{th}$ receiving antenna, $h_m^{(i,j)}$ is the $m^{th}$ coefficient (tap) in the channel impulse response between the $i^{th}$ transmitting antenna and the $j^{th}$ receiving antenna, and $n^{(j)}$ is the noise vector at the $j^{th}$ receiving antenna. The memory of this path (i.e., the largest value of m for which $h_m^{(i,j)}$ is not zero) is denoted by $v^{(i,j)}$.

It may be noted that it not unreasonable to assume, that the memory of the transmission channel is the same for all i,j links ($n_i \times n_o$ such links), in which case $v^{(i,j)} = v$. Alternatively, the $v^{(i,j)}$ limit in equation (1) can be set to that v which corresponds to maximum length of all of the $n_i \times n_o$ channel input responses, i.e., $v = \max_{i,j} v^{(i,j)}$. It may also be noted that all of the variables in equation (1) are actually l×1 column vectors, corresponding to the l time samples per symbol in the oversampled FIG. 1 arrangement.

By grouping the received samples from all $n_o$ antennas at symbol time k into an $n_o l \times 1$ column vector $y_k$, one can relate $y_k$ to the corresponding $n_i \times 1$ (column) vector of input samples as follows $$y_k = \sum_{m=0}^{v} H_m x_{k-m} + n_k, \quad (2)$$

where $H_m$ is the MIMO channel coefficients matrix of size $n_o l \times n_i$, $x_{k-m}$ is a size $n_i \times 1$ input (column) vector, and $n_k$ is a size $n_o l \times 1$ vector.

Over a block of $N_f$ symbol periods, equation (2) can be expressed in matrix notation as follows:

$$\begin{bmatrix} y_{k-N_f-1} \\ y_{k+N_f-2} \\ \vdots \\ y_k \end{bmatrix} = \begin{bmatrix} H_0 & H_1 & \ldots & H_v & 0 & \ldots & 0 \\ 0 & H_0 & H_1 & \ldots & H_v & 0 & \ldots \\ \vdots & \vdots & \vdots & \vdots & \vdots & \ddots & \vdots \\ 0 & \ldots & 0 & H_0 & H_1 & \ldots & H_v \end{bmatrix} \begin{bmatrix} x_{k+N_f-1} \\ x_{k+N_f-2} \\ \vdots \\ x_{k-v} \end{bmatrix} + \begin{bmatrix} n_{k+N_f-1} \\ n_{k+N_f-2} \\ \vdots \\ n_k \end{bmatrix} \quad (3)$$

or, more compactly, $$y_{k+N_f-1:k} = H x_{k+N_f-1:k-v} + n_{k+N_f-1:k}. \quad (4)$$

The subscripts in equation (4) indicate a range. For example $k+N_f-1:k$ means the range from $k+N_f-1$ to k, inclusively.

It is useful to define the following correlation matrices:

$$R_{xy} \equiv E[x_{k+N_f-1:k-v} y^*_{k+N_f-1:k}] = R_{xx} H^* \quad (5)$$

$$R_{yy} \equiv E[y_{k+N_f-1:k} y^*_{k+N_f-1:k}] = H R_{xx} H^* + R_{nn}, \quad (6)$$

$$R_{xx} \equiv E[x_{k+N_f-1:k-v} x^*_{k+N_f-1:k-v}] \text{ and} \quad (7)$$

$$R_{nn} \equiv E[n_{k+N_f-1:k} n^*_{k+N_f-1:k}], \quad (8)$$

and it is assumed that these correlation matrices do not change significantly in time or, at least, do not change significantly over a time interval that corresponds to a TDMA burst (assumed to be much shorter than the channel coherence time), which is much longer than the length of the FIR filters in element 23 (in symbol periods denoted by $N_f$). Accordingly, a re-computation within processor 22 of the above matrices, and the other parameters disclosed herein, leading to the computation of the various filter coefficients, need not take place more often than once every TDMA burst. Once H, $R_{xx}$ and $R_{nn}$ are ascertained (through the conventional use of training sequences), $R_{xy}$ and $R_{yy}$ are computed by $R_{xx} H^*$ and $H R_{xx} H^* + R_{nn}$, respectively.

Figure 2:
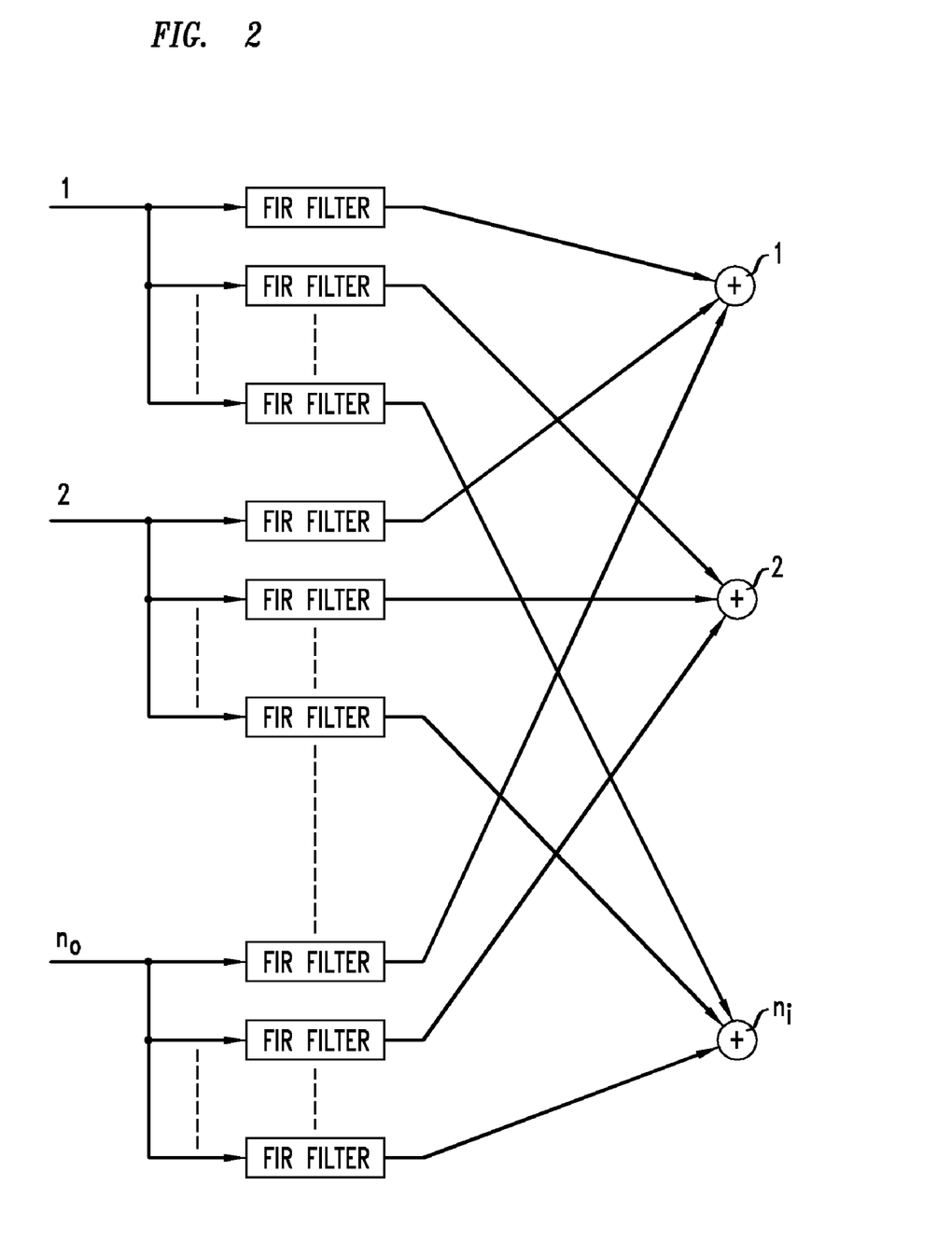
FIG. 2 presents the structure of elements 23 and 26, where element 26 differs in size from element 23 in that element 23 has $n_o$ number of inputs and $n_o \times n_i$ filters, whereas element 26 has $n_i$ number of inputs and $n_i \times n_i$ filters.

In accordance with the principles disclosed herein, element 23 comprises a collection of FIR filters that are interconnected as shown in FIG. 2, and the impulse response coefficients of element 23 can be expressed by $W^* = [W^*_0 \ W^*_1 \ldots W^*_{N_f-1}]$, each having $N_f$ matrix taps $W_i$, of size $(l n_o \times n_i)$. That is, $W_i$ has the form:

$$W_i = \begin{bmatrix} w_i^{(1,1)} & \ldots & w_i^{(1,n_i)} \\ \vdots & \ldots & \vdots \\ w_i^{(n_o,1)} & \ldots & w_i^{(n_o,n_i)} \end{bmatrix} \quad (9)$$

where each entry in $W_j^{(p,q)}$ is an l×1 vector corresponding to the l output samples per symbol. Stated in other words, the matrix $W_0$ specifies the $0^{th}$ tap of the set of filters within element 23, the matrix $W_1$ specifies the $1^{st}$ tap of the set of filters within element 23, etc.

Also in accordance with the principles disclosed herein, element 26 comprises a collection of FIR filters that also are interconnected as shown in FIG. 2, and the impulse response coefficients of element 26 is chosen to be equal to $$[I_{n_i} 0_{n_i \times n_i N_b}] - B^* = [(I_{n_i} - B^*_0) B^*_1 \ldots B^*_{N_b}], \quad (10)$$

where $B^*$ is expressed by $B^* = [B^*_0 B^*_1 \ldots B^*_{N_b}]$, with ($N_b + 1$) matrix taps $B_i$, each of size $n_i \times n_i$. That is, $B_i$ has the form:

$$B_i = \begin{bmatrix} b_i^{(1,1)} & \ldots & b_i^{(1,n_i)} \\ \vdots & \ldots & \vdots \\ b_i^{(n_i,1)} & \ldots & b_i^{(n_i,n_i)} \end{bmatrix}. \quad (11)$$

Stated in other words, $B_0$ specifies the $0^{th}$ tap of the set of filters within element 26, the matrix $B_1$ specifies the $1^{st}$ tap of the set of filters within element 26, etc.

Defining $\tilde{B}^* = [0_{n_i \times n_i \Delta_b} B^*]$, where $\tilde{B}^*$ is a matrix of size $n_i \times n_i (N_f + v)$, the value of $N_b$ is related to the decision delay by the equality $(\Delta + N_b + 1) = (N_f + v)$.

The error vector at time k is given by $$E_k = \tilde{B}^* x_{k+N_f-1:k-v} - W^* y_{k+N_f-1:k} \quad (12)$$

Therefore, the $n_i \times n_i$ error auto-correlation matrix is $$R_{ee} \equiv E[E_k^* E_k] \qquad (13)$$
$$= \tilde{B}^* R_{xx} \tilde{B} - \tilde{B}^* R_{xy} W - W^* R_{yx} \tilde{B} + W^* R_{yy} W$$
$$= \tilde{B}^* (R_{xx} - R_{xy} R_{yy}^{-1} R_{yx}) \tilde{B}^* +$$
$$(W^* - \tilde{B}^* R_{xy} R_{yy}^{-1})(W^* - \tilde{B}^* R_{xy} R_{yy}^{-1})$$
$$= \tilde{B}^* R^\perp \tilde{B} + G^* R_{yy} G$$

Using the Orthogonality Principle, which states that $E[E_k y^*_{k+N_f-tk}]=0$, it can be shown that the optimum matrix feedforward and feedback filters are related by $$W^*_{opt} = \tilde{B}^*_{opt} R_{xy} R_{yy}^{-1} \qquad (14)$$
$$= \tilde{B}^*_{opt} R_{xx} H^* (H R_{xx} H^* + R_{nn})^{-1}$$
$$= \tilde{B}^*_{opt} (R_{xx}^{-1} + H^* R_{nn}^{-1} H)^{-1} H^* R_{nn}^1,$$

and the $n_i \times n_i$ auto-correlation matrix $R_{ee}$ is $$R_{ee} \equiv E[E_k E_k^*] \qquad (15)$$
$$= \tilde{B}^* (R_{xx} - R_{xy} R_{yy}^{-1} R_{yx}) \tilde{B}$$
$$= \tilde{B}^* R^\perp \tilde{B}$$
$$= \tilde{B}^* (R_{xx} - R_{xx} H^* (H R_{xx} H^* + R_{nn})^{-1} H R_{xx}) \tilde{B}$$
$$= \tilde{B}^* (R_{xx}^{-1} + H^* R_{nn}^{-1} H)^{-1} \tilde{B}.$$

$R_{ee}$ can also be expressed as $R_{ee} = \tilde{B}^* R^{-1} \tilde{B}$, where $R = R_{xx}^{-1} + H^* R_{nn}^{-1} H$.

It remains to optimize values for the B matrix and the W matrix such that, in response to specified conditions, the trace (or determinant) of $R_{ee}$ is minimized. The following discloses three approaches to such optimization.

Scenario 1

In this scenario, it is chosen to process only previous receiver decisions. These decisions relate to different users that concurrently have transmitted information that has been captured by antennas 21-1-21-$n_o$ and detected in circuit 25. That means that feedback element 26 uses only delayed information and that the $0^{th}$ order coefficients of the filters within element 26 have the value 0. Therefore, in light of the definition expressed in equation (10), this scenario imposes the constraint of $B_0 = I_{n_i}$.

To determine the optimum matrix feedback filter coefficients under this constraint, the following optimization problem needs to be solved:

$$\min_{\tilde{B}} R_{ee} = \min_{\tilde{B}} \tilde{B}^* R^{-1} \tilde{B}, \quad \text{subject to } \tilde{B}^* \Phi = C^* \qquad (16)$$

where $$\Phi \equiv \begin{bmatrix} I_{n_i} & 0 & \cdots & 0 \\ 0 & I_{n_i} & \vdots & \vdots \\ \vdots & 0 & \ddots & I_{n_i} \\ 0 & \cdots & \cdots & 0 \end{bmatrix} \text{ and } C^* = \begin{bmatrix} 0_{n_i \times n_i \Delta} & I_{n_i} \end{bmatrix} \qquad (17)$$

It can be shown that the solution to the above is given by $$\tilde{B}_{opt} = R \Phi (\Phi^* R \Phi)^{-1} C, \qquad (18)$$

resulting in the error signal $$R_{ee,min} = C^* (\Phi^* R \Phi)^{-1} C \qquad (19)$$

If we define the partitioning $$R \equiv \begin{bmatrix} R_{11} & R_{12} \\ R_{12}^* & R_{22} \end{bmatrix}, \qquad (20)$$

where $R_{11}$ is of size $n_i(\Delta+1) \times n_i(\Delta+1)$, then $$\tilde{B}_{opt} = \begin{bmatrix} R_{11} \\ R_{12}^* \end{bmatrix} R_{11}^{-1} C = \begin{bmatrix} I_{n_i(\Delta+1)} \\ R_{12}^* R_{11}^{-1} \end{bmatrix} C \qquad (21)$$

and $$R_{ee,min} = C^* R_{11}^{-1} C, \qquad (22)$$

where the delay parameter $\Delta$ is adjusted to minimize the trace (or determinant) of $R_{ee,min}$. Once $\tilde{B}_{opt}$ is known, equation (14) is applied to develop $W^*_{opt}$.

Figure 3:
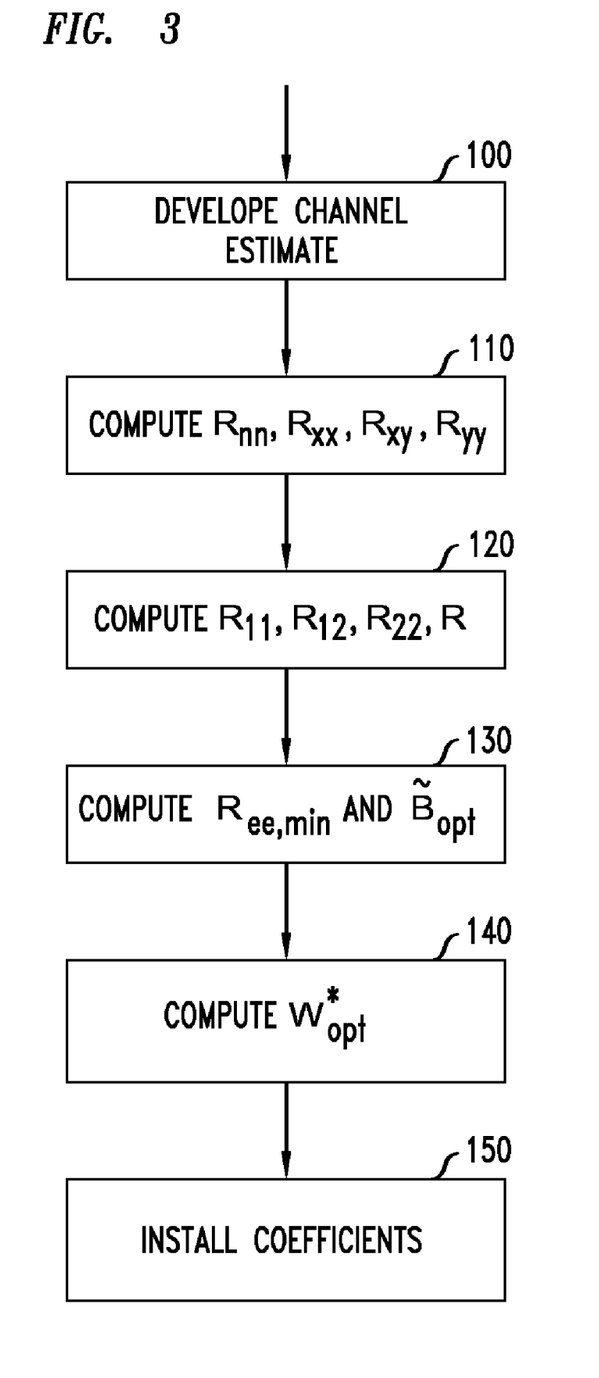
FIG. 3 is a flowchart describing one method carried out by processor 22.

FIG. 3 presents a flowchart for carrying out the method of determining the filter coefficients that processor 22 computes pursuant to scenario 1. Step 100 develops an estimate of the MIMO channel between the input points and the output point of the actual transmission channel. This is accomplished in a conventional manner through the use of training sequences. The estimate of the MIMO channel can be chosen to be limited to a given memory length, v, or can be allowed to include as much memory as necessary to reach a selected estimate error level. That, in turn, depends on the environment and is basically equal to the delay spread divided by $T_s$.

Following step 100, step 110 determines the matrices, $R_{nn}$, $R_{xx}$, $R_{xy}$ and $R_{yy}$. The matrix $R_{nn}$ is computed by first computing n=y-Hx and then computing the expected value E[n*n]—see equation (8) above. The matrix $R_{xx}$ is computed from the known training sequences—see equation (7) above—(or is pre-computed and installed in processor 22). In may be noted that for uncorrelated inputs, $R_{xx}=I$. The matrices $R_{xy}$ and $R_{yy}$ are computed from the known training sequences and the received signal or directly from H and $R_{nn}$—see equations (5) and (6) above.

Following step 110, step 120 computes $R=R_{xx}^{-1}-H^*R_{nn}^{-1}H$, and the partition components, $R_{11}$, $R_{12}$, and $R_{22}$, as per equation (20). Following step 120, step 130 computes $R_{ee,min}$ from equation (22) and adjusts $\Delta$ to minimize the trace (or determinant) of $R_{ee,min}$, computes $\tilde{B}_{opt}$ from equation (21), and from $\tilde{B}_{opt}$ determines the coefficients of the $n_i \times n_i$ filters of element 26, pursuant to equation (10). Step 140 computes $W^*_{opt}$ from equation (14), and finally, step 150 installs the coefficients developed in step 130 into the filters of element 26 and the coefficients developed in step 140 into the filters of element 23.

A second approach for computing $\tilde{B}_{opt}$ utilizes the block Cholesky factorization (which is a technique that is well known in the art):

$$R \equiv R_{xx}^{-1} + H^* R_{nn}^{-1} H \quad (22)$$
$$= \begin{bmatrix} L_1 & 0 \\ L_2 & L_3 \end{bmatrix} \begin{bmatrix} D_1 & 0 \\ 0 & D_2 \end{bmatrix} \begin{bmatrix} L_1^* & L_2^* \\ 0 & L_3^* \end{bmatrix}$$
$$\equiv LDL^*,$$

where $L_1$ is of size $n_i(\Delta+1) \times n_i(\Delta+1)$. Using the result in equations (18) and (19) yields $$\tilde{B}_{opt} = \begin{bmatrix} I_{n_i(\Delta+1)} \\ L_2 L_1^{-1} \end{bmatrix} C = \begin{bmatrix} I_{n_i} \\ L_2 L_1^{-1} C \end{bmatrix} \quad (23)$$
$$= L[e_{n_i \Delta_{opt}} \cdots e_{n_i(\Delta_{opt}+1)-1}]$$

and $$R_{ee,min} = C^* D_1^{-1} C \quad (24)$$
$$= diag(d_{n_i \Delta_{opt}}^{-1}, \cdots, d_{n_i(\Delta_{opt}+1)-1}^{-1}),$$

where the index $\Delta_{opt}$ is chosen (as before) to minimize the trace and determinant of $R_{ee,min}$. Using equation (23), equation (14) can be expressed as follows $$W_{opt}^* = \tilde{B}_{opt}^* R_{xx} H^* (H R_{xx} H^* + R_{nn})^{-1} \quad (25)$$
$$= \tilde{B}_{opt}^* (R_{xx}^{-1} + H^* R_{nn}^{-1} H)^{-1} H^* R_{nn}^{-1}$$
$$= \begin{bmatrix} d_{n_i \Delta_{opt}}^{-1} e_{n_i \Delta_{opt}}^* \\ \vdots \\ d_{n_i(\Delta_{opt}+1)-1}^{-1} e_{n_i(\Delta_{opt}+1)-1}^* \end{bmatrix} L^{-1} H^* R_{nn}^{-1}$$

Yet a third approach for computing $\tilde{B}_{opt}$ and $R_{ee,min}$ defines $\tilde{B}^* = [C^* \overline{B}^*]$ and partitions $R^\perp$ into as $$\begin{bmatrix} R_{11}^\perp & R_{12}^\perp \\ R_{12}^{\perp *} & R_{22}^\perp \end{bmatrix},$$

where $R_{11}^\perp$ is of size $n_i(\Delta+1) \times n_i(\Delta+1)$, to yield $$R_{ee} = \tilde{B}^* R^\perp \tilde{B} \quad (26)$$
$$\equiv [C^* \ \overline{B}^*] \begin{bmatrix} R_{11}^\perp & R_{12}^\perp \\ R_{12}^{\perp *} & R_{22}^\perp \end{bmatrix} \begin{bmatrix} C \\ \overline{B} \end{bmatrix}$$
$$\equiv [I_{n_i} \ \overline{B}^*] \begin{bmatrix} \overline{R}_{11}^\perp & \overline{R}_{12}^\perp \\ \overline{R}_{12}^{\perp *} & \overline{R}_{22}^\perp \end{bmatrix} \begin{bmatrix} I_{n_i} \\ \overline{B} \end{bmatrix}$$
$$= (\overline{R}_{11}^\perp - \overline{R}_{12}^\perp (\overline{R}_{22}^\perp)^{-1} \overline{R}_{12}^{\perp *}) + (\overline{B}^* + \overline{R}_{12}^\perp (\overline{R}_{22}^\perp)^{-1})$$
$$\overline{R}_{22}^\perp (\overline{B}^* + \overline{R}_{12}^\perp (\overline{R}_{22}^\perp)^{-1})^*,$$

where $\overline{R}_{11}^\perp \equiv C^* R_{11}^\perp C$ and $\overline{R}_{12}^\perp \equiv C^* R_{12}^\perp$. Therefore, $$B_{opt} = -\overline{R}_{12}^\perp (\overline{R}_{22}^\perp)^-$$

$$W_{opt}^* = [0_{n_i \times n_i \Delta} I_{n_i} - \overline{R}_{12}^\perp (\overline{R}_{22}^\perp)^{-1}] (R_{xx} H^* (H R_{xx} H^* + R_{nn})^{-1} \quad (27)$$

$$R_{ee,min} = \overline{R}_{11}^\perp - \overline{R}_{12}^\perp (\overline{R}_{22}^\perp)^{-1} \overline{R}_{12}^{\perp *} \quad (28)$$

Scenario 2

In this scenario it is assumed that users whose signals are received by the FIG. 1 receiver are ordered so that lower-indexed users are detected first, and current decisions from lower-indexed users are used by higher-indexed users in making their decisions, i.e., $B_0$ is a lower-triangular matrix. The general results of equations (21) and (22) can be applied by setting $C' = [0_{n_i \times n_i \Delta} B^*_0]$ where $B_0$ is an $n_i \times n_i$ monic lower-triangular matrix whose entries are optimized to minimize trace($R_{ee,min}$). To this end, a partitioning can be defined where $$R_{11}^{-1} \equiv \begin{bmatrix} R_1 & R_2 \\ R_2^* & R_3 \end{bmatrix}, \quad (29)$$

$R_{11}$ being the term corresponding to $R_{11}$ of equation (20), with $R_1$ being of size $n_i \Delta \times n_i \Delta$, and $R_3$ being of size $n_i \times n_i$. Equation (22) simplifies to $$R_{ee,min} = B^*_0 R_3 B_0 \quad (30)$$

It can be shown that, the optimum monic lower-triangular $B_0$ that minimizes trace($R_{ee,min}$) is given by the nomic lower-triangular Cholesky factor of $R_3^{-1}$, i.e., $$R_3^{-1} = L_3 D_3 L_3^*, \quad (31)$$

which yields $$B_0^{opt} = L_3 \quad (32)$$

and $$R_{ee,min} = D_3^{-1}. \quad (33)$$

The result is that $$\tilde{B}_{opt} = \begin{bmatrix} I_{n_i(\Delta+1)} \\ R_{12}^* R_{11}^{-1} \end{bmatrix} C,$$

as expressed in equation (21), with the modified value of $R_{11}^{-1}$, and with $$C^* = 0_{n_i \times n_i \Delta} B^*_0 \quad (34)$$

A second approach for computing the optimum FIR filter coefficients for the FIG. 1 receiver involves computing a standard—rather than a block—Cholesky factorization of the matrix $R = R_{xx}^{-1} + H^* R_{nn}^{-1} H$ (see the definition following equation (15)) in the form $LDL^*$. Then, the coefficients of the element 23 filters is given by the $n_i$ adjacent columns of L that correspond to a diagonal matrix with the smallest trace. Therefore, equations (23) and (25) are used to compute the corresponding coefficients, with the understanding that L is now a lower-triangular matrix, rather than a block lower-triangular matrix. The equivalence of the two approaches can be shown using the nesting property of Cholesky factorization.

Figure 4:
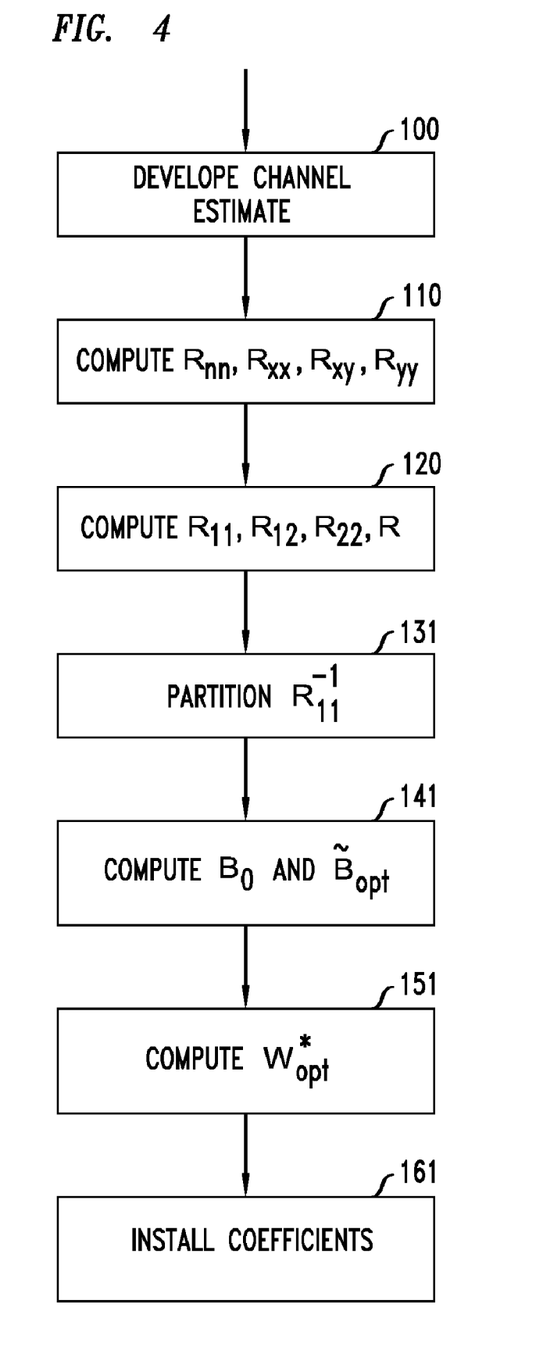
FIG. 4 is a flowchart describing another method carried out by processor 22.

FIG. 4 presents a flowchart for carrying out the method of determining the filter coefficients that processor 22 computes pursuant to scenario 2. Steps 100 through 120 are the same as in FIG. 3, but the method diverges somewhat in the following steps. In step 131 the partition according to equation (20) is developed for a $\Delta$ that minimizes $R_{ee,min}$ of equation (33), and control passes to step 141, where $B_0^{opt}$ is computed based on equations (31) and (32), followed by a computation of $\tilde{B}_{opt}$ based on equations (21) and (34). Following step 141, step 151 computes $W^*_{opt}$ from equation (14), and finally, step 161 installs the coefficients developed in step 141 into the filters of element 26 and the coefficients developed in step 151 into the filters of element 23.

Scenario 3

When multistage detectors are employed, current decisions from all other users, obtained from a previous detection stage, are available to the user of interest. Therefore, suppressing their interfering effects would improve the performance of the receiver. This detection scenario has the same mathematical formulation as scenarios 1 and 2, except that $B_0$ is now constrained only to be monic, i.e., $e_i^* B_0 e_i = 1$ for all $0 \leq i \leq n_i - 1$. The general results in equations (21) and (22) still apply with $C = [0_{n_i \times n_i \Delta} B^*_0]$ where $B_0$ is optimized to minimize trace($R_{ee,min}$). In short, under scenario 3, the following optimization problem is solved:

$$\min_{B_0} \text{trace}(B_0^* R_3 B_0) \text{ subject to } e_i^* B_0 e_i = 1 \quad (33)$$

for all $0 \leq i \leq n_i - 1$, where $R_3$ is as defined in equation (29). Using Lagranage multiplier techniques, it can be shown that the optimum monic $B_0$ and the corresponding MMSE are given by $$B_0^{opt} = \frac{R_3^{-1} e_{i-1}}{e_i^* R_3^{-1} e_i}; \quad 0 \leq i \leq n_i - 1. \quad (34)$$

Thus, the method of determining the filter coefficients that processor 22 computes pursuant to scenario 3 is the same as the method depicted in FIG. 4, except that the computation of $B_0^{opt}$ within step 141 follows the dictates of equation (34).

With the above analysis in mind, a design of the filter coefficients of the filters within elements 23 and 26 can proceed for any given set of system parameters, which includes:
MIMO channel memory between the input points and the output point of the actual transmission channel, v,
The number of pre-filter taps chosen, $N_f$,
The shortened MIMO memory, $N_b$,
The number of inputs to the transmission channel, $n_i$,
The number of output derived from the transmission channel, $n_o$,
The autocorrelation matrix of the inputs, $R_{xx}$,
The autocorrelation matrix of the noise, $R_{nn}$,
The oversampling used, l, and
The decision delay, $\Delta$.

It should be understood that a number of aspects of the above disclosure are merely illustrative, and that persons skilled in the art may make various modifications that, nevertheless, are within the spirit and scope of this invention.

The invention claimed is:

1. A receiver having $n_o$ receiving antennas and adapted to respond to signals that are concurrently transmitted by $n_i$ antennas that are remote from said receiver, comprising:
a feed-forward filter module consisting of $n_0$ blocks of Finite Impulse Response (FIR) filters, each having (a) an input that is coupled to signals that are related to signals received by a different one of said $n_0$ antennas, (b) outputs $O_j$, j=1, 2, ..., $n_i$, (c) an FIR filter between said input and each of said $n_i$ outputs, the $n_0$ blocks of FIR filters thus having $n_0 \times n_i$ FIR filters, where coefficients of said $n_0 \times n_i$ FIR filters are computed based on environmental parameters that are designer specified;
means for developing sums $S_j$, j=1, 2, ..., $n_i$, where sum $S_j$ combines the $j^{th}$ output of each of the $n_0$ blocks of FIR filters;
a subtractor block for subtracting from each of said sums $S_j$ a signal $D_j$, j=1, 2, ..., $n_i$ to result in signals $E_j$, j=1, 2, ..., $n_i$;
a decision block responsive to said signals $E_j$ for developing $n_i$ output signals $G_j$; and
a feedback filter module consisting of $n_i$ blocks of feedback FIR filters, each having (a) a feedback FIR filter input that is coupled to a different one of said signals $G_j$, (b) feedback FIR filter outputs $H_j$, j=1, 2, ..., $n_i$, (c) a FIR filter between said feedback FIR filter input and each of said $n_i$ feedback FIR filter outputs, the $n_i$ blocks of feedback FIR filters thus having $n_i \times n_i$ FIR filters, where coefficients of said $n_i \times n_i$ FIR filters are computed based on environmental parameters that are designer specified.

2. The receiver of claim 1 where said signals that are received by said receiver comprises symbols, with an intersymbol period of T, and said receiver further includes a sampling circuit interposed between said $n_0$ receiving antennas and said feed-forward filter module, where the sampling circuit oversamples by a factor of k, where k is an integer greater than 1.

3. The receiver of claim 1 where the $0^{th}$ order coefficients of all of the FIR filters in said feedback filter module are restricted to have 0 value.

* * * * *